United States Patent
Grimm et al.

(10) Patent No.: US 9,430,944 B2
(45) Date of Patent: Aug. 30, 2016

(54) METHOD AND APPARATUS FOR DETERMINING TRAFFIC SAFETY EVENTS USING VEHICULAR PARTICIPATIVE SENSING SYSTEMS

(71) Applicant: GM GLOBAL TECHNOLOGY OPERATIONS LLC, Detroit, MI (US)

(72) Inventors: Donald K. Grimm, Utica, MI (US); Fan Bai, Ann Arbor, MI (US); Rozalina Ebrahimian, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/539,764

(22) Filed: Nov. 12, 2014

(65) Prior Publication Data
US 2016/0133130 A1 May 12, 2016

(51) Int. Cl.
*G08G 1/09* (2006.01)
*G08G 1/0967* (2006.01)
*H04W 4/04* (2009.01)
*H04L 29/08* (2006.01)
*H04W 4/00* (2009.01)
*G08G 1/01* (2006.01)
*G08G 1/127* (2006.01)

(52) U.S. Cl.
CPC ...... *G08G 1/096766* (2013.01); *G08G 1/0104* (2013.01); *G08G 1/091* (2013.01); *G08G 1/096716* (2013.01); *G08G 1/096741* (2013.01); *G08G 1/096775* (2013.01); *G08G 1/127* (2013.01); *H04L 67/12* (2013.01); *H04W 4/008* (2013.01); *H04W 4/046* (2013.01)

(58) Field of Classification Search
CPC .... G08G 1/091; G08G 1/127; G08G 1/0104; G08G 1/096715; G08G 1/096741; G08G 1/096775
USPC .................................. 340/902, 905; 701/117
See application file for complete search history.

(56) References Cited

U.S. PATENT DOCUMENTS

| | | | | |
|---|---|---|---|---|
| 5,812,069 A | * | 9/1998 | Albrecht et al. | 340/905 |
| 7,825,824 B2 | * | 11/2010 | Shrum, Jr. | 340/902 |
| 8,498,775 B2 | | 7/2013 | Yngve et al. | |
| 2011/0012753 A1 | * | 1/2011 | Shrum, Jr. | 340/902 |

FOREIGN PATENT DOCUMENTS

GB 2461551 A 1/2010

* cited by examiner

*Primary Examiner* — John A Tweel, Jr.
(74) *Attorney, Agent, or Firm* — John A. Miller; Miller IP Group, PLC (57) ABSTRACT

Methods and systems are disclosed for participative sensing of events and conditions by road vehicles, collection of this data from a large number of road vehicles by a central server, processing the data to identify events and conditions which may be of interest to other vehicles in a particular location, and sending notifications of the events and conditions to vehicles. A large number of vehicles use participative sensing systems to identify a safety-related event or condition which should be reported to the central server—such as a large pothole, an obstacle in the roadway, an icy road surface, a traffic accident, etc. The central server stores and aggregates the data, filters it and ages it. Vehicles requesting advisories from the central server will receive notices of safety-related events and conditions based on their location and heading. Driver warnings can be issued, and vehicle systems may respond to the notices.

21 Claims, 9 Drawing Sheets

METHOD AND APPARATUS FOR DETERMINING TRAFFIC SAFETY EVENTS USING VEHICULAR PARTICIPATIVE SENSING SYSTEMS

BACKGROUND OF THE INVENTION

1. Field of the Invention

This invention relates generally to using crowd-sourced data from vehicles to determine traffic conditions and events and, more particularly, to a method and apparatus for determining traffic events using vehicular participative sensing systems, where data from multiple vehicles can be collected and analyzed on a central server and used to detect or infer various types of traffic safety-related conditions and events, including specific conditions and events detected in real time and chronic conditions that tend to recur regularly, and advisories of the traffic safety-related conditions and events are communicated to vehicles on the road.

2. Discussion of the Related Art

Many vehicles now include systems which can sense a wide range of parameters related to the vehicle's operating environment. For example, vehicle dynamics sensors can define a vehicle's dynamic state, object detection systems can detect objects and other vehicles on and around a roadway, the status of a vehicle's systems such as braking, steering, ABS and airbags is available, and traffic and road conditions can be determined by a variety of methods. Most of this data is evaluated and used by the host vehicle in real time, and discarded when it becomes stale.

At the same time, telematics systems are also available onboard many modern vehicles, where the telematics systems continuously or regularly communicate data from the vehicle to a centralized database system, which also communicates information back to vehicles. Although these telematics systems have been used to gather some limited types of vehicle data for specific purposes—such as detecting airbag deployment in a vehicle and automatically requesting emergency services—much more data could be collected from a large number of vehicles, and this data could be used to identify a wide range of traffic and road conditions which can be disseminated to and beneficial to other vehicles in a certain geographic locale.

SUMMARY OF THE INVENTION

In accordance with the teachings of the present invention, methods and systems are disclosed for participative sensing of events and conditions by road vehicles, collection of data regarding the events and conditions from a large number of road vehicles by a central server, processing the data to identify events and conditions which may be of interest to other vehicles in a particular location, and sending notifications of the events and conditions to vehicles as appropriate. A large number of vehicles use participative sensing systems to identify a safety-related event or condition which should be reported to the central server—such as a large pothole which has been encountered, an obstacle in the roadway, an icy road surface, a traffic accident, etc. The central server stores and aggregates the data, filters it and ages it. Vehicles requesting advisories from the central server, typically via a telematics system—will receive notices of safety-related events and conditions which may be significant based on their location and heading. Driver warnings can be issued, and vehicle systems can be adapted (e.g., suspension tuning or transmission mode can be changed) in response to the notices.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and apparatus for determining traffic safety events using vehicular participative sensing systems is merely exemplary in nature, and is in no way intended to limit the invention or its applications or uses.

Many vehicles are now equipped with a wide range of sensors and systems which can provide data which is indicative of the conditions the vehicle is operating in and events which may have occurred in the vicinity of the vehicle. By collecting such data from a large number of vehicles and aggregating it to detect trends, a significant amount of information can be deduced which would be useful to—and can be communicated to—other vehicles in the vicinity.

Figure 1:
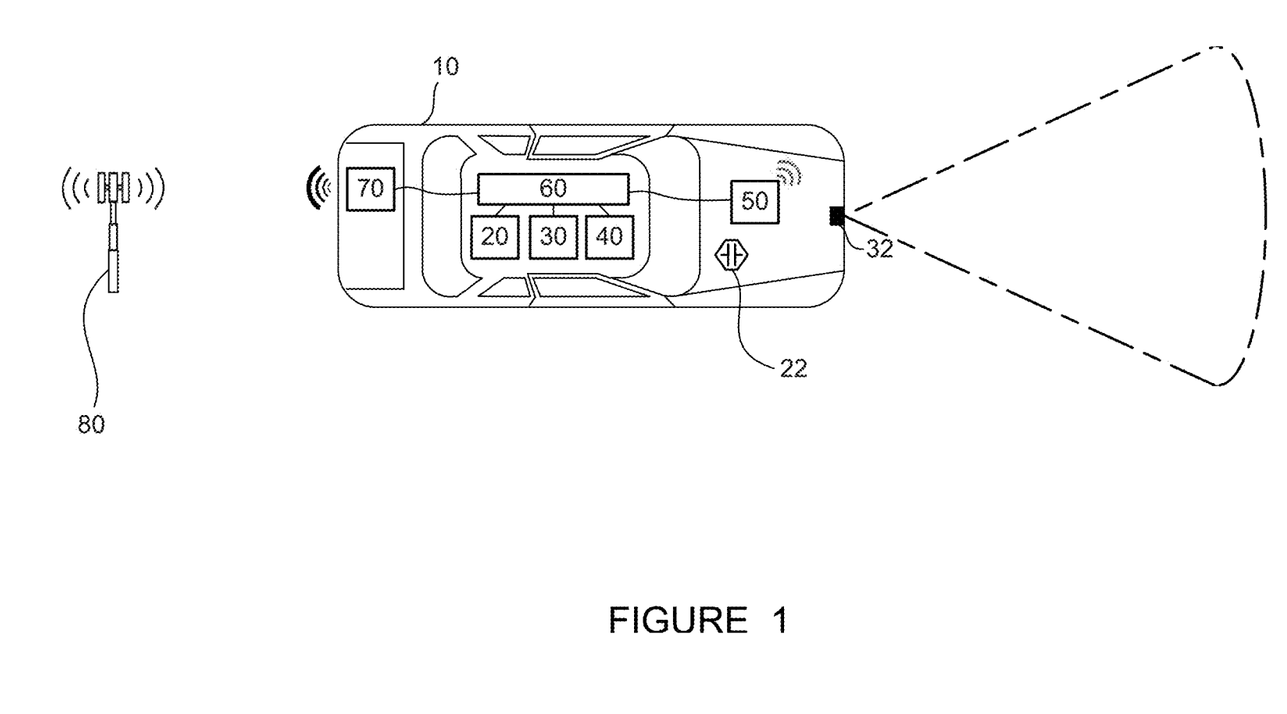
FIG. 1 is a schematic illustration of a vehicle with participative sensing systems and a telematics system for communicating data to a collection system.

FIG. 1 is a schematic illustration of a vehicle 10 with participative sensing systems and telematics system capability for communicating data to a collection system. The vehicle 10 includes a vehicle dynamics module 20 for determining vehicle dynamic conditions and other related parameters. The vehicle dynamics module 20 receives data from at least one sensor 22. Typically, many of the sensors 22 would be provided, including wheel speed sensors, longitudinal, lateral and vertical acceleration sensors, and a yaw rate sensor. The sensors 22 may also include wheel load sensors and other types of sensors. The vehicle dynamics module 20 collects data from all of the sensors 22 and performs calculations as necessary to provide a complete representation of the dynamic conditions of the vehicle 10—including positions, velocities, accelerations and forces affecting the vehicle 10.

The vehicle 10 also includes an object detection module 30. The object detection module 30 receives data from at least one object detection sensor 32—which could be a camera-based sensor or may use radar, lidar or some other type of object detection technology (including short range communications technologies such as Dedicated Short Range Communications [DSRC] or Ultra-Wide Band [UWB]). More than one of the object detection sensors 32 may be provided, including forward view, rear view and side view sensors. Using data from the sensors 32, the object detection module 30 identifies objects in the vicinity of the vehicle 10, where the objects may include other vehicles, curbs and other roadway boundaries, pedestrians and any sort of objects that may be on or near the roadway. The object detection module 30 can distinguish between regular-size cars and light trucks and other, larger vehicles such as delivery trucks and semi-trailer trucks. The object detection module 30 can also determine the velocity of other vehicles on the roadway, and identify situations where vehicles are stopped that should ordinarily be moving (such as on a highway). In addition, the object detection module 30 can identify lane boundary markings and compute the position of the vehicle 10 relative to the lane or lanes on the roadway.

The vehicle 10 also includes a system status module 40 which collects data from a vehicle data communications bus regarding the status of virtually any vehicle system. For example, the system status module can determine conditions such as; windshield wipers on, off or intermittent; headlights on or off; throttle position; brake pressure; anti-lock brake system (ABS) activation; traction control system (TCS) activation; airbag deployment; seat occupancy; steering wheel position; ambient temperature; infotainment system usage including in-vehicle cell phone usage; HVAC system settings; etc. The data collected by the system status module 40 can be used to identify many different types of driving situations and conditions, as will be discussed at length below.

The vehicle 10 also includes a vehicle-to-vehicle (V2V) communications module 50, which communicates with other, similarly-equipped vehicle within communications range, using Dedicated Short Range Communications (DSRC) or other communications technology. The V2V communications module 50 can collect significant amounts of data from nearby vehicles, particularly including position, velocity and acceleration data—as is needed for "smart highway" or autonomous vehicle systems.

Data from the vehicle dynamics module 20, the object detection module 30, the system status module 40 and the V2V communications module 50 are provided to a data collection module 60. The data collection module 60 is in communication with a telematics system 70, which communicates with a telematics central service via cellular communication towers 80 or other technologies. The other communications technologies may include, but are not limited to, DSRC or other vehicle-to-infrastructure (V2I) communications, Wi-Fi, satellite communications, etc.

It is to be understood that the vehicle dynamics module 20, the object detection module 30, the system status module 40, the V2V communications module 50 and the data collection module 60 are comprised of at least a processor and a memory module, where the processors are configured with software designed to perform data collection and computations as discussed above.

It is to be further understood that the features and calculations of the vehicle dynamics module 20, the object detection module 30, the system status module 40, the V2V communications module 50 and the data collection module 60 could be allocated differently than described herein without departing from the spirit of the disclosed invention. For example, although the functions of the modules 20-60 are described as being distinct throughout this disclosure, they could in fact all be programmed on the same processor, or more or fewer than the five distinct modules shown.

Figure 2:
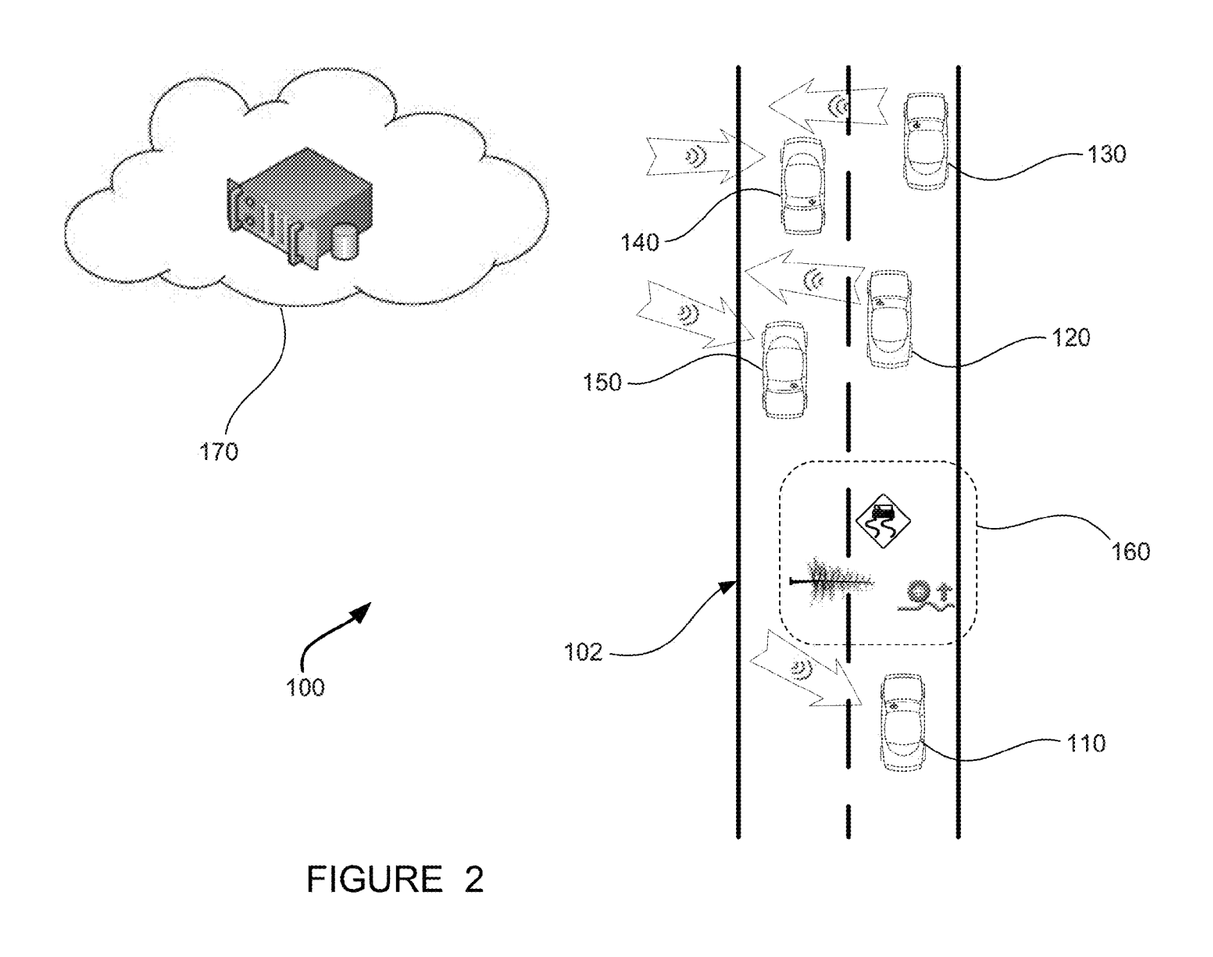
FIG. 2 is an illustration of several vehicles on a roadway, where some vehicles can provide road event data to a central server and the server can communicate alerts out to other vehicles which are approaching the event location.

FIG. 2 is an illustration of a scenario 100 with several vehicles on a roadway 102, where some vehicles can provide road event data to a central server and the server can communicate advisories out to other vehicles which are approaching the event location. The scenario 100 includes vehicles 110-150, driving on the 2-lane road 102, where the vehicles 110, 120 and 130 are driving in one direction, and the vehicles 140 and 150 are driving in the other direction. An event location 160 is indicated with the dashed box, where the event location 160 could be a bad pothole, a patch of slippery road, a tree or other object on the road surface, or any of a variety of other conditions. The vehicles 120 and 130 have already passed through the event location 160, and have collected data indicative of the event or condition. For example, a large pothole could be detected by a wheel load spike in one vehicle and an evasive steering maneuver in another vehicle, a slippery road surface could be detected by traction control system and/or anti-lock braking system activation, and an object on the road surface could be detected by the object detection module 30.

The vehicles 120 and 130 communicate data regarding the event location 160 to a central server 170. The central server 170 is shown as a cloud-based device, meaning that it could be one or more servers existing anywhere on a globally-connected network. The central server 170 may be part of a telematics service, such as the service which is used by the telematics system 70 of the vehicle 10. The central server 170 may instead be operated by any business or government entity that can collect and disseminate data from a large number of vehicles with participative sensing systems.

In the case of a tree or other obstacle on the roadway 102, as an example, the vehicles 120 and 130 would both have detected the large, static object in an unexpected location on the road surface. The vehicles 120 and 130 may also have performed braking and/or steering maneuvers in response to the presence of the obstacle. This data is communicated to the central server 170, in the manner discussed relative to the vehicle 10 of FIG. 1. In some instances, even a single vehicle reporting an event or condition may be compelling enough for the central server 170 to issue advisories out to other vehicles. But there is power in large numbers, and the server 170 can determine the existence of more conditions, and with greater accuracy, by aggregating data from many vehicles.

In the scenario 100, based on the report of an obstacle on the road by the vehicles 120 and 130, the server 170 issues advisories to the vehicle 110, which is going to encounter the condition imminently. The vehicle 110 can take action in a number of different ways in response to the information it receives, including issuing an alert to the driver, terminating cruise control if it is activated, slowing down the vehicle 110 by applying the brakes, taking evasive steering action, and re-focusing object detection sensors onboard the vehicle 110 to attempt to locate the obstacle. Similar types of actions, and others (e.g., modifying the navigation route, adapting the safety system warning timings), could be taken by the vehicle 110 in the event of other types of reports—such as potholes, slippery road surface, traffic accident, etc.—by the vehicles 120 and 130 via the central server 170.

The server 170 also issues advisories of the obstacle in the roadway 102 to the vehicles 140 and 150, which are headed in the direction of the event location 160. Although the vehicles 140 and 150 are travelling in the opposite direction and lane of travel from the vehicles 120 and 130 which reported the obstacle, it is apparent from FIG. 2 that they may benefit from the advisory. Many factors can be considered by the server 170 in determining to which vehicles advisories should be issued—including the nature of the reported event or condition, the specific location of the event or condition on the road surface (center of lane, left shoulder, etc.), whether the roadway 102 is divided and how many lanes of travel are available in each direction, etc. These factors will be discussed further below.

The three types of conditions (pothole, slippery road, obstacle) described above and shown in FIG. 2 are merely exemplary; many other types of safety-related roadway and vehicle conditions may be detected by vehicles and communicated to the central server 170. Other conditions which may be reported by the vehicles 120/130 include one or more vehicles exceeding the speed limit by a significant amount, vehicles travelling significantly slower than the speed limit, rain, snow or fog, any significant or unusual usage of vehicle controls such as steering, throttle or brakes, airbag deployment, etc. Furthermore—although the scenario 100 is described in terms of the vehicles 120 and 130 communicating data to the server 170 and the vehicles 110, 140 and 150 receiving data from the server 170—in reality, all of the vehicles 110-150 would be in continuous 2-way communications with the server 170.

As can be understood from the above discussion, each of the vehicles 110-150 will continuously gather data from onboard systems—such as the vehicle dynamics module 20, the object detection module 30, the system status module 40 and the V2V communications module 50 of the vehicle 10. However, it is not likely to be practical for every vehicle to communicate all of this raw data to the server 170. Rather, in one preferred embodiment, each of the participative sensing system vehicles 110-150 performs calculations locally to determine what threats—or hazardous events or conditions—exist which warrant sending a report to the server 170.

The calculations by each participative sensing system vehicle, which may be performed on the data collection module 60, may include several parts. For example, an obstacle or object on the roadway greater than a certain predetermined size, detected via object detection, may trigger an immediate report to the server 170. Likewise, a traffic accident, or a pothole strike resulting in a wheel load greater than a certain threshold, may also trigger an immediate report to the server 170.

However, other types of threats or hazardous conditions may only be determined by evaluating multiple parameters. An example of this would be determining that a particular surrounding vehicle is driving in a dangerous manner. A threat level $TL_i$ of a particular vehicle i may be calculated as:

$$TL_i = \Sigma_{j=1}^{m} w_j p_j^i \quad (1)$$

Where $w_j$ is a weighting value associated with a specific property j, and $p_j^i$ is the property (such as braking, acceleration, or speed) for the vehicle i. The property $p_j^i$ is in turn calculated as:

$$p_j^i = f(x_i^1, x_i^2, \ldots, x_i^n) \quad (2)$$

Where $x_i^1, x_i^2, \ldots, x_i^n$ are vehicle parameters obtained from raw serial data from the vehicle dynamics module 20, the object detection module 30, the system status module 40 and the V2V communications module 50.

Using the above calculations, a threat level $TL_i$ for a vehicle i can be computed. In an exemplary embodiment, a "watch" report could be issued to the server 170 if the threat level exceeds a first threshold. A watch report would be indicative of a vehicle exhibiting moderately hazardous driving behavior, which could be followed at the server 170 to see if other corroborating reports are received. A "warning" report could be issued to the server 170 if the threat level of a vehicle exceeds a second, higher threshold. A warning report would be indicative of a vehicle exhibiting severely dangerous driving behavior, which could trigger the server 170 to immediately issue advisories out to surrounding vehicles.

The above example describes calculating a threat level of a surrounding vehicle based on several different properties of the particular surrounding vehicle. A similar approach could be used to calculate a threat level of a location on a roadway, based on properties of multiple vehicles (such as how many vehicles are braking unexpectedly on a freeway). The participative sensing system vehicle 120 (as an example) can thus send hazardous condition reports to the server 170 based on individual or cumulative data about itself (such as a pothole strike or a loss of traction), based on calculations focused on another vehicle (such as dangerous driving behavior), or based on calculations focused on a location on a roadway (such as a traffic slowdown).

Figure 3:
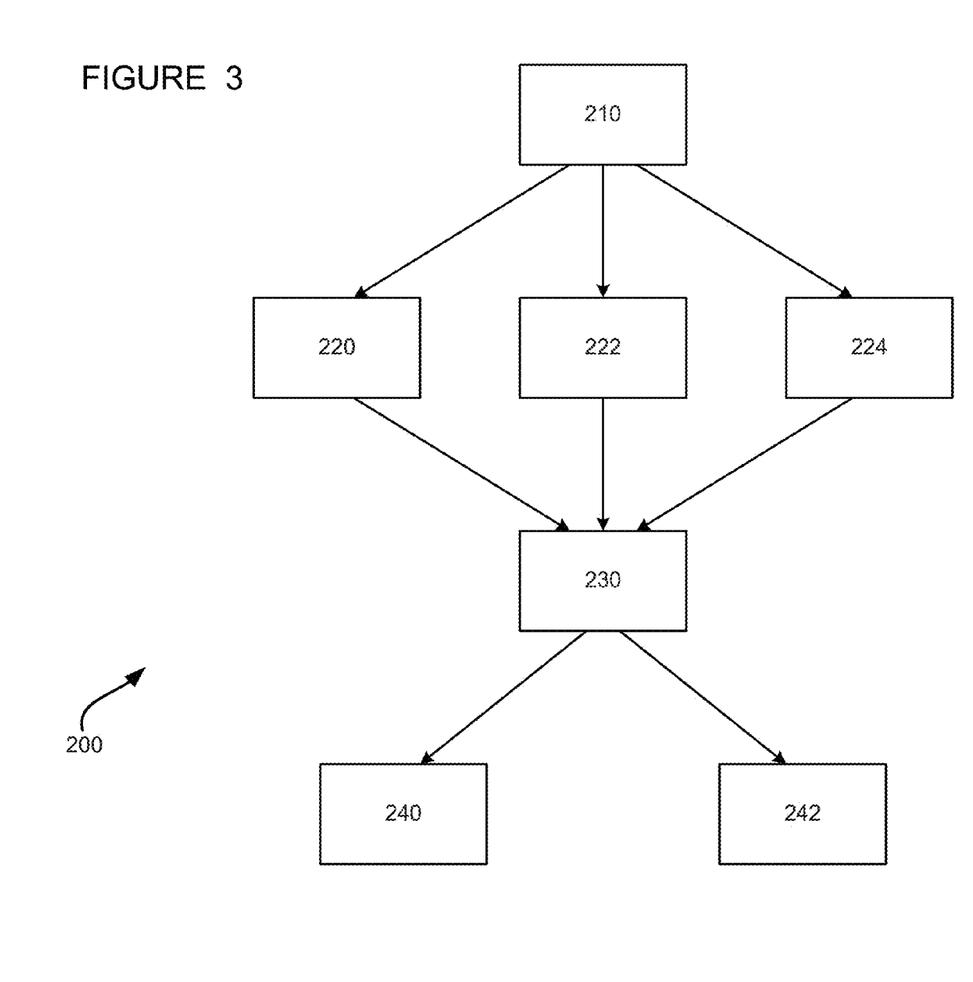
FIG. 3 is a block diagram showing data flow in the central server and out to vehicles and other interested parties.

FIG. 3 is a block diagram 200 showing data flow in the central server 170 and out to vehicles and other interested parties. At box 210, data is collected from many participative sensing vehicles, such as the vehicle 10 of FIG. 1 and the vehicles 110-150 of FIG. 2. Although a single vehicle report of an event such as a traffic accident can be sufficiently definitive to result in advisories being issued to other vehicles in the vicinity, the real power of the disclosed methods lies in continuous data collection from large numbers of vehicles. For example, a single vehicle driver tapping the brakes on a freeway would not, in and of itself, be noteworthy. But if many vehicles report a brake tap at a certain location on a freeway, it is likely indicative of a developing heavy traffic condition, which could quickly degenerate into a stop-and-go traffic situation. If reduced visibility or wet/icy road conditions also exist in the heavy traffic area, and if vehicle speeds are still high, advisories of the braking activity ahead may well be warranted for vehicles approaching the braking zone. This is just one example of how data from many vehicles can be used to identify conditions that could not be deduced from a single vehicle or a small number of vehicles.

The server 170 will continuously receive data from many thousands, or millions, of vehicles. Therefore, methods must be employed to analyze the data to detect or infer various types of potential hazardous driving conditions, and determine to whom the hazardous driving conditions should be communicated. One technique for doing this is to segregate the potential hazardous driving situations into three types; those that relate to the behavior of specific other vehicles and their drivers, those that relate to chronic conditions that occur at a particular fixed location on a roadway, and those that relate to transient conditions at various locations on the roadway.

At box 220, hazardous driving situations related to the behavior of specific other vehicles and their drivers are identified from the data collected at the box 210. As discussed previously, vehicles such as the vehicle 10 of FIG. 1 can collect and report to the central server 170 a significant amount of data about other vehicles in their immediate vicinity—with this data being collected at least by the object detection module 30 and the V2V communications module 50. Analysis of velocity and acceleration data from other vehicles, in particular, can reveal potential driving threats such as dangerous driving behavior, distracted driving, intoxicated or impaired driving, etc. These behaviors can be detected by vehicle speeds significantly higher than the speed limit, speed significantly lower than the speed limit where not caused by heavy traffic, accelerations above a threshold (such as 0.1 g) and/or hard braking events above a threshold (such as 0.3 g), especially where the acceleration or braking events occur repeatedly, extreme tailgating, hard steering activity above a threshold (such as 10 deg/sec), wandering off-center in lane and/or partially across lane boundaries, etc. The idea that a specific dangerous driver/vehicle (or dangerous types of crowd behavior) can be identified, and other vehicles in the vicinity warned of the hazard, is extremely powerful. Of course, the location of the dangerous driver/vehicle is constantly changing, and the anticipated location can be taken into account when issuing hazard warnings to other vehicles. For example, a hazard warning could be issued for "dangerous driver may be encountered at next intersection approaching from right". Furthermore, the identification of the dangerous driver/vehicle or dangerous driving area is made much more robust by aggregating participative sensing data from many vehicles on the roadway.

At box 222, hazardous driving situations related to chronic conditions that occur at a particular fixed location on a roadway are identified from the data collected at the box 210. These chronic or static conditions are the types of things that occur repeatedly and regularly—such as traffic jams at a particular intersection or stretch of freeway at rush hour on weekdays. These chronic conditions may be caused by poor roadway designs such as complex merges or overly tight road curvature, poorly timed traffic signals, road construction, or simply roads or intersections that can't handle the traffic volume due to insufficient lanes or other factors. Chronic conditions can easily be identified at the box 222 by monitoring data from many vehicles over a period of days or months and detecting densely packed traffic traveling at speeds significantly below the posted speed limit. Similarly, locations where an inordinate number of traffic accidents occur can be identified. When these conditions are detected regularly, a chronic hazardous traffic location has been identified. Notification of the chronic hazardous traffic location can be provided to approaching vehicles, and also to whatever governmental Transportation Department or Road Commission has responsibility for the roadway in question.

At box 224, hazardous driving situations related to transient conditions at various locations on the roadway are identified from the data collected at the box 210. The transient conditions which are identified at the box 224 are temporary in nature, unlike the chronic conditions identified at the box 222. Transient hazardous driving conditions may be caused by weather conditions, a traffic accident, poor road condition, a traffic signal outage or other event, and may include poor visibility, wet or icy road surface, pothole or debris on the road, accident vehicles and/or emergency vehicles on the road or the shoulder, etc. These conditions may be identified by many different types of data provided by the participative sensing system vehicles—including low vehicle speeds, object detection data (stopped vehicles or other objects where they don't belong on the roadway), wheel load data indicative of a pothole, anti-lock brake or traction control system activations indicative of a slippery road surface, and others. Hazard warnings such as "severe pothole ahead in right lane" or "disabled vehicle ahead on left shoulder" can be issued based on the data identified at the box 224.

At box 230, data fusion of the safety metrics from the boxes 220/222/224 is performed. The fusion of the safety metrics combines the three types of hazardous driving conditions described above—along with their associated communications parameters—into a single database for dissemination. The fusion also identifies correlations between the three types of hazardous driving conditions—such as traffic accidents from the box 224 and chronic rush hour congestion at the box 222.

The data at the boxes 210-230 will preferably have one or more decay function applied to it. For example, the raw event data from individual vehicles at the box 210 may have certain rules for half-life and eventual purging, where each individual event report may carry full weight for a predetermined amount of time, and then decay in weight factor after that. Similarly, the hazardous conditions which are determined at the boxes 220/222/224 (and fused at the box 230) may have different decay functions, where dangerous driver conditions detected at the box 220 may decay very quickly, chronic conditions detected at the box 22 may decay very slowly, and transient conditions detected at the box 224 may decay at an intermediate rate.

Finally, the data which has been collected, aggregated and analyzed by the server 170 results in advisories which can be issued to vehicles such as the vehicles 110-150. These advisories take two general forms.

At box 240, advisories are issued in what can be referred to as "relaxed real time". Whereas "real time" would imply advisories being issued within milliseconds of occurrence of an event, relaxed real time refers to advisories being issued generally within a matter of seconds to the vehicles which can benefit from the information. This is not to imply that advisories cannot be issued in real time by the server 170. A real time advisory may be issued, for example, in a situation where vehicles are travelling at a high speed and an accident has just occurred immediately ahead. On the other hand, relaxed real time advisories may be issued in many instances where warranted by traffic conditions or road conditions ahead. In some of these cases, it takes time for an event to develop to the point where a hazardous condition is evident, thus requiring data collection from many vehicles for a period of many seconds or minutes. In other cases, a hazardous condition such as a pothole or a traffic accident may be known, but notification to other individual vehicles is most advantageously delayed until each of the vehicles is a certain distance or time away from encountering the condition. The optimal notification lead time may vary from a few seconds to a minute or more, depending on many factors. These factors include the type and severity of the hazardous condition, traffic conditions such as speed and density, road conditions such as slippery or low visibility, and others.

At box 242, long term characterization advisories are issued to vehicles or other entities. Long term characterization advisories to vehicles may include advisories which can be used for route planning—such as a recommendation to avoid taking a certain route which is chronically congested at the expected time of travel, or an advisory that a certain road is frequently used for racing and other dangerous driving late at night. Long term characterization advisories to other entities may include advisories to road commissions regarding hazardous traffic conditions resulting from roadway design (complex merges, insufficient lanes), traffic signal timing, potholes, icy roads, and many other conditions. Some of these advisories (such as those relating to roadway design) may be based on analysis of data over a period of weeks or months, while others (those needing urgent attention and correction—such as those relating to icy roads or traffic signal outages) may be issued after just a minute or two.

The advisories from the data at the box 240 are preferably issued using the telematics system 70, which is in direct and continuous communications with the central server 170. As mentioned previously, the telematics system 70 could perform many different actions depending on the nature of the advisory, including issuing an audible, visual and/or haptic alert to the driver, terminating cruise control if it is activated, slowing down the vehicle by applying the brakes, taking evasive steering action, and re-focusing object detection sensors. The advisories from the data at the box 242 could be via the telematics system 70 in the case of advisories to vehicles, and could be sent via email, text message or other communications medium in the case of advisories to road commissions, fleet operators or other vehicle administrators.

Figure 4:
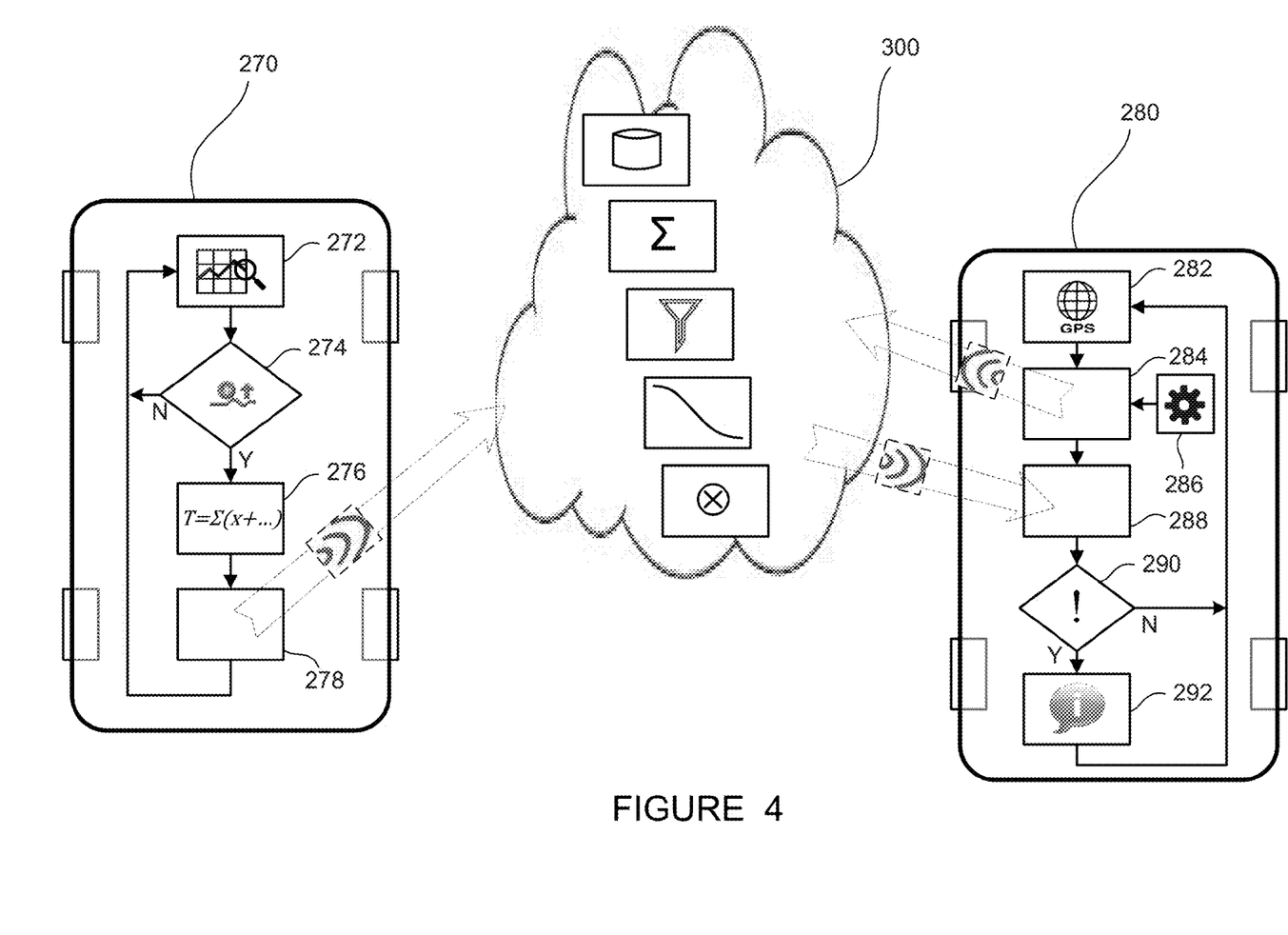
FIG. 4 is a combined block diagram and flowchart diagram showing a method used by a participative sensing vehicle, data flow to and processing in a cloud-based system, and a method used by a vehicle requesting advisories.

FIG. 4 is a combined block diagram and flowchart diagram showing a method used by a participative sensing vehicle, data flow to and processing in a cloud-based system, and a method used by a vehicle requesting advisories. A data collection vehicle 270 could be any of the vehicles 10, or 110-150 discussed previously. That is, the collection vehicle 270 has participative sensing systems for collecting data about itself and surrounding vehicles and conditions, and sending that data for centralized collection, aggregation and dissemination. The vehicle 270 runs a process which begins at box 272 where data is monitored. The data being monitored at the box 272 includes all of the data about the vehicle 270 itself and surrounding vehicles and conditions, as discussed at length previously.

At decision diamond 274, it is determined whether an event trigger has occurred. The event trigger could be a single specific event such as hitting a large pothole or skidding on an icy patch of road, or the event trigger could be a cumulative observation such as extended travel over a patch of rough road or constant tailgating by another vehicle. If no event trigger is detected, the process returns to the box 272 for continued monitoring of data. If an event trigger is detected, then at box 276 one or more safety metrics are calculated. The safety metrics are calculated using the techniques described above, including Equations (1) and (2). At box 278, the one or more safety metrics are submitted to a cloud server 300 for aggregation. Along with the safety metrics, other information may be submitted to the cloud server 300—including, at a minimum, the location of the collection vehicle 270.

An advisory-receiving vehicle 280—also equivalent to the vehicles 110-150 discussed previously—is any road vehicle equipped with a communications system (such as a telematics system or a V2V/V2I system) capable of receiving advisories from the cloud server 300. If the vehicle 280 has advisory receiving turned on, then it runs a process as shown in FIG. 4. At box 282, the vehicle 280 acquires its geographic location using GPS. If the vehicle 280 is not GPS-equipped, it may still be able to acquire its location by other techniques, such as V2V communications with another vehicle which does have GPS and a known position relative to the other vehicle. At box 284, the vehicle 280 requests safety tags from the cloud server 300 based on its geographic location. As discussed previously, the server 300 may have safety event and condition information from millions of vehicles and covering large geographic areas, so it is necessary for the vehicle 280 to identify its location in order to obtain only relevant safety tags (those which apply to the road ahead of the vehicle 280, or possibly intersecting roads).

At box 286, customization menu settings are applied for the vehicle 280. These settings include things like; receive advisories on or off; types of advisories to receive; whether to use audio or visual systems to notify the driver of advisories received; etc.

At box 288, the vehicle 280 processes response tags received from the cloud server 300. At decision diamond 290, the vehicle 280 determines whether to issue an alert to the driver based on the response tags (advisories) received. The decision to issue an alert or not is based on the settings as established at the box 286. For example, a driver may have set a preference to be notified only of urgent warning-level advisories, in which case the vehicle 280 would not issue an alert for an informational advisory related to a moderate traffic slowdown ahead, for example.

If no alert is to be issued, then from the decision diamond 290 the process returns to the box 282 to reacquire geographic location and again request advisories. If an alert is to be issued, then at box 292 the alert is delivered to the driver in whatever form is selected (audio/visual/haptic) by the driver, based on the content of the response tags received at the box 288. The process then returns to the box 282.

The cloud server 300 of FIG. 4 is equivalent to the central server 170 of FIG. 2. The functions of the cloud server 300 are basically to receive safety-related data reports from many vehicles, store and process the data, and disseminate safety-related advisories to many vehicles as they are relevant to each individual vehicle. As discussed previously, the cloud server 300 could be a server or cluster of servers at a single physical location, or the server 300 could be a true cloud-based architecture including multiple servers at multiple locations with replicated and shared data.

The data in the cloud server 300 follows a lifecycle which includes storage, aggregation, filtering, decay and eventual purging. These lifecycle steps—particularly the aggregation, filtering and decay—were discussed previously relative to the block diagram of FIG. 3.

Using the methods disclosed above, safety-related traffic events and conditions can be detected using data from many participative sensing system vehicles. By aggregating and filtering data from a large number of participating vehicles, safety-related events and conditions can be identified which would otherwise go undetected. In addition, the accuracy and timeliness of identified safety-related events and conditions are increased by virtue of the large number of reports on which they are based. Vehicle drivers can benefit from the information contained in the accurate, timely and relevant safety-related advisories—thereby avoiding dangerous situations which would have occurred in absence of the advisories.

Participative sensing systems can also be used to collect and disseminate other types of information besides safety-related events and conditions. One example of other data that can be collected, and also benefits from a large number of sampling vehicles, is road surface friction.

As discussed previously relative to safety-related events and conditions, data collection from large numbers of vehicles increases the accuracy of the parameter being measured. In the case of road surface friction, multiple vehicles which each traverse a slightly different tire contact path, and each of which may be in different phases of braking or acceleration, provide a rich source of data. After the road surface friction data from many vehicles is aggregated and fused, the resulting road friction estimation can be disseminated to driving vehicles where it can be both displayed to drivers and used automatically by vehicle systems such as traction control.

Several use cases for road friction data by vehicle systems are evident. Adaptive powertrain management systems can modify current transmission mode selection (e.g., normal, sport, winter) in a continuous manner based on estimated road surface friction. Also, all-wheel drive (AWD) vehicles can adaptively modify wheel torque distribution for optimal traction based on road friction data. In addition, stability control systems can adapt their control parameters based on road friction data, and could also warn drivers of upcoming curve conditions, or even automatically slow down the vehicle in the case of an upcoming curve which cannot safely be negotiated under current friction conditions. Finally, of course, driver notification of low friction conditions can be provided.

In general, road surface friction estimation using participative sensing system vehicles works in the same way as the safety-related events and conditions detection discussed previously. That is, an individual participative sensing system vehicle such as the vehicle 10 of FIG. 1 contains sensors and systems to detect current conditions, compute an estimated road friction and communicate the friction to a data collection service. Many vehicles—such as the vehicles 110-150 of FIG. 2—communicate their friction data to the central server 170, which processes the data and disseminates it back out to the vehicles 110-150 and others.

Figure 5:
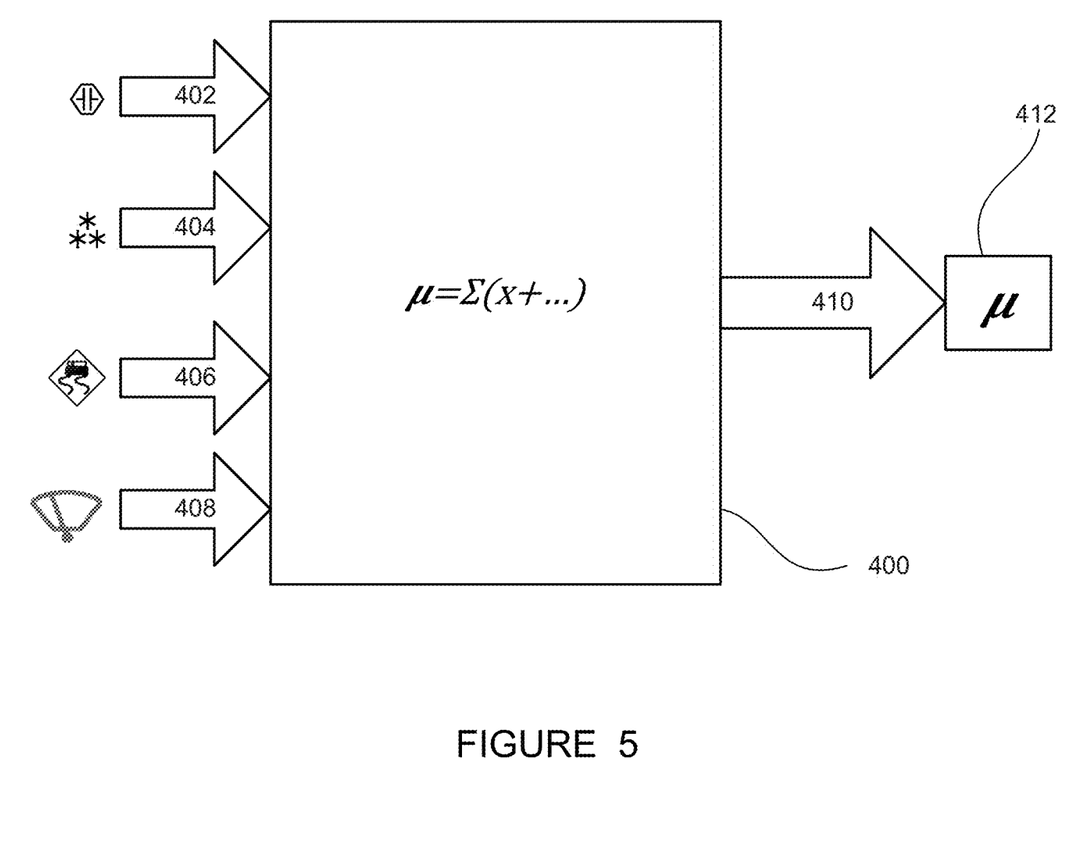
FIG. 5 is a block diagram of a road surface condition classifier which can be used in a vehicle to determine road surface friction conditions.

In addition to the systems and sensors of the vehicle 10, a participative sensing system vehicle for road friction estimation needs a road surface condition classifier. FIG. 5 is a block diagram of a road surface condition classifier 400, which may be a stand-alone processor or may be incorporated or embodied in the data collection module 60 (or other processor module) of the vehicle 10. The road surface condition classifier 400 receives inputs including data from vehicle sensors (vehicle dynamics and others) on line 402, data from environmental sensors (temperature, humidity, precipitation conditions from laser or camera, etc.) on line 404, stability control system status data (whether anti-lock brakes, traction control and/or stability control have been activated) on line 406 and windshield wiper system status (off/intermittent/low/high) on line 408. Using these inputs, the road surface condition classifier 400 calculates a road friction condition value for the present time and vehicle location, where the road friction condition is classified on a scale from 1 (very low—such as in ice or heavy snow, temperature is below freezing, frequent anti-lock brake and traction control activations) to 10 (very high—warm, dry road, no friction mitigating factors).

Figure 6:
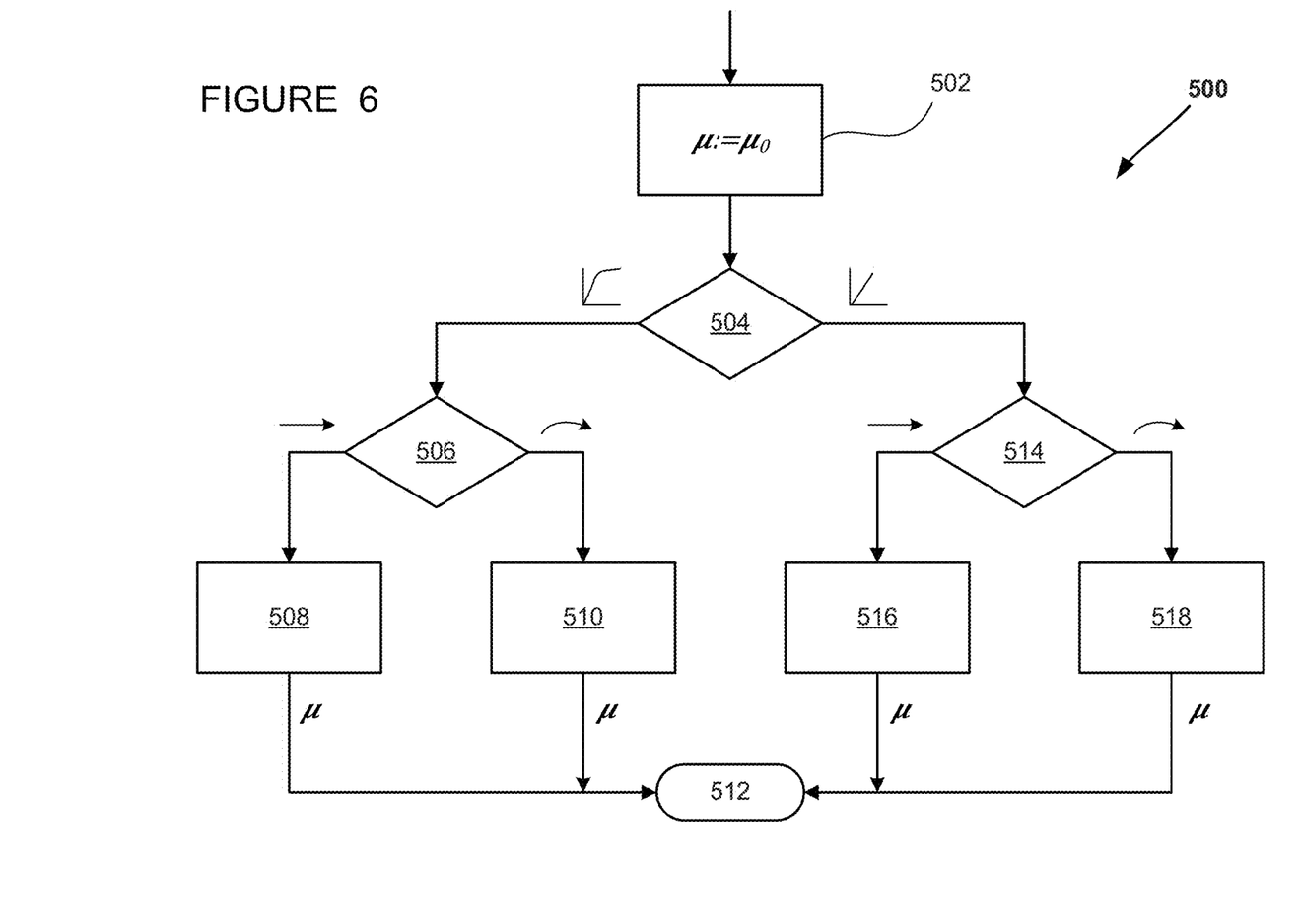
FIG. 6 is a flowchart diagram showing a method for calculating an estimated coefficient of friction for a vehicle based on vehicle dynamic conditions.

It is also possible for the road surface condition classifier 400 to compute not only a relative condition value but also an estimated coefficient of friction $\mu$ for the current road surface. FIG. 6 is a flowchart diagram 500 showing a method for calculating an estimated coefficient of friction $\mu$ for a vehicle based on vehicle dynamic conditions. At box 502, a working coefficient of friction is set equal to an initial coefficient of friction $\mu_0$, or a previously calculated coefficient of friction. At decision diamond 504, it is determined whether the vehicle is in the linear range of tire performance, where tire slip ratio is a virtually linear function of longitudinal force and tire slip angle is a virtually linear function of lateral force. The linear range determination can be made using the vehicle sensor data (including steering wheel angle, lateral acceleration and yaw rate, for example) and stability control system data.

If the vehicle is operating in the nonlinear range, then at decision diamond 506 it is determined whether the vehicle is driving in a straight line or a curve. This determination can also be made using the vehicle sensor data such as steering wheel angle, lateral acceleration and yaw rate. If the vehicle is driving in a straight line (i.e., no lateral acceleration), then at box 508 the coefficient of friction $\mu$ is calculated based on longitudinal slip/friction only. A method for calculating tire-road friction in longitudinal-only conditions can be found in U.S. Pat. No. 8,498,775, issued Jul. 30, 2013, titled "LINEAR AND NON-LINEAR IDENTIFICATION OF THE LONGITUDINAL TIRE-ROAD FRICTION COEFFICIENT", and assigned to the assignee of the present application.

If the vehicle is driving in a curve, then at box 510 the coefficient of friction $\mu$ is calculated for a nonlinear range of vehicle operation using the equation:

$$\mu = \frac{\max(a_y(t), a_y(t-\Delta T))}{g} \tag{3}$$

Where $a_y$ is the vehicle lateral acceleration, t is the current time, (t–$\Delta$T) is the previous time step or measurement, and g is the acceleration of gravity. In other words, in the nonlinear regime where there is ample lateral acceleration, the lateral acceleration is limited by and dictated by the coefficient of friction, thereby allowing the coefficient of friction to be directly calculated from the lateral acceleration.

After the coefficient of friction $\mu$ is calculated at either the box 508 or the box 510, the value of $\mu$ is stored and the process ends at terminus 512.

If the vehicle is operating in the linear range (as determined at the decision diamond 504), then at decision diamond 514 it is determined whether the vehicle is driving in a straight line or a curve. If the vehicle is driving in a straight line (i.e., no lateral acceleration), then at box 516 the coefficient of friction $\mu$ is calculated based on longitudinal slip/friction only, as discussed previously for the box 508.

If the vehicle is driving in a curve, then at box 518 the coefficient of friction $\mu$ is calculated for a linear range of vehicle operation using the equation:

$$\mu = \frac{1}{2}\left(\frac{\hat{C}_{cf}(t)}{C_{of}} + \frac{\hat{C}_{cr}(t)}{C_{or}}\right) \tag{4}$$

Where $C_{of}$ and $C_{or}$ are the front and rear (respectively) tire lateral stiffness on dry pavement, which can be predetermined from tire characteristics, and $\hat{C}_{cf}(t)$ and $\hat{C}_{cr}(t)$ are the estimated front and rear (respectively) tire lateral stiffness on any given surface, computed on a continual basis. A method for calculating the estimated current-condition tires stiffnesses $\hat{C}_{cf}(t)$ and $\hat{C}_{cr}(t)$ can be found in Great Britain Patent No. GB2461551, issued Mar. 6, 2012, titled "VEHICLE SIDE SLIP VELOCITY ESTIMATION", and assigned to the assignee of the present application.

After the coefficient of friction $\mu$ is calculated at either the box 516 or the box 518, the value of $\mu$ is stored and the process ends at the terminus 512.

As outlined above, the road surface condition classifier 400 of FIG. 5, using the method shown in the flowchart diagram 500 of FIG. 6, enables any participative sensing system vehicle to estimate its local road surface friction (both a relative condition value and an actual coefficient of friction). By aggregating the road friction data from many participative sensing system vehicles, it is possible to provide a very accurate estimate of road friction which is specific to particular roadways and particular locations. Such information is otherwise extremely difficult to determine in real time and at the required accuracy from a single vehicle that is moving through a geographic area.

Figure 7:
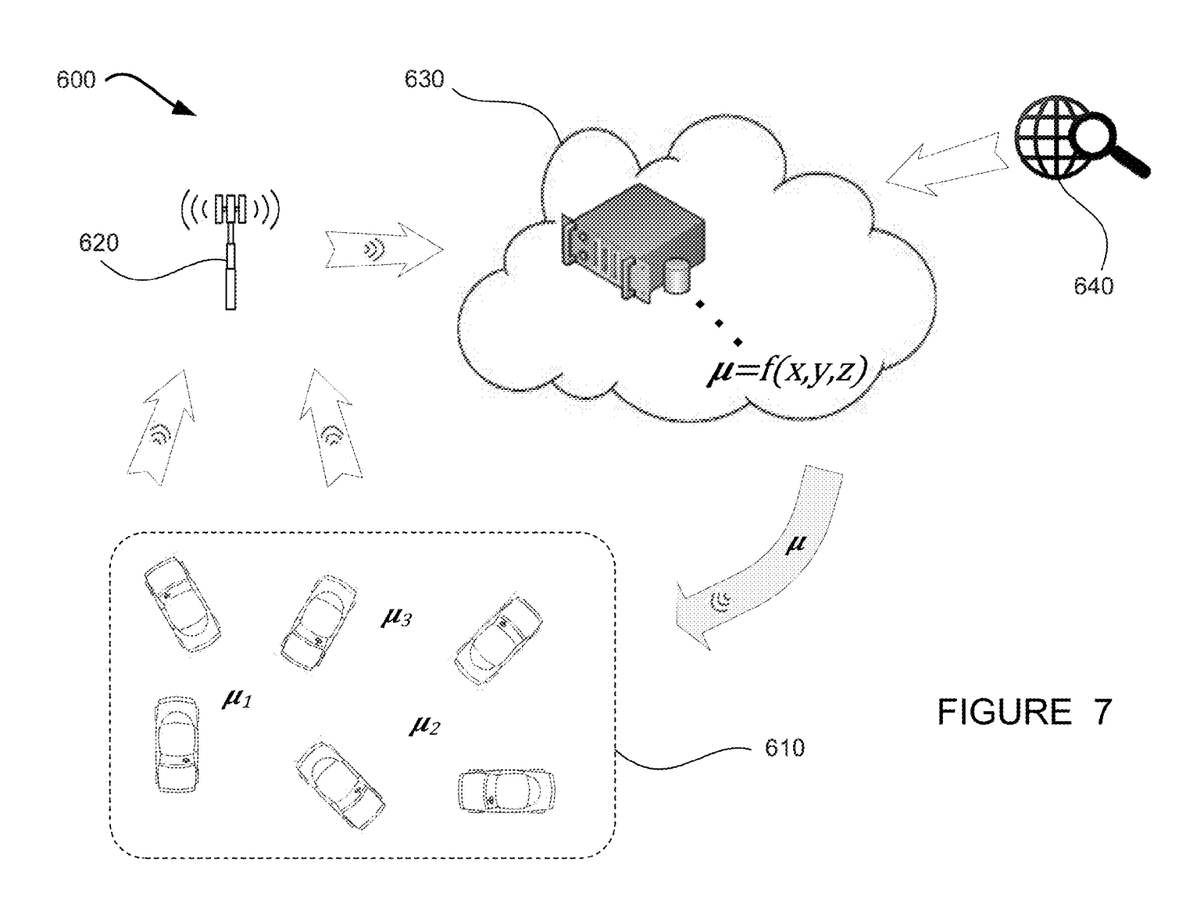
FIG. 7 is an illustration of a scenario with several participative sensing vehicles providing road friction data to a central server, and the server communicating friction estimations back out to the vehicles.

FIG. 7 is an illustration of a scenario 600 with several participative sensing system vehicles providing road friction data to a central server, and the server communicating friction estimations back out to the vehicles. A plurality of vehicles 610 includes participative sensing system vehicles as described previously relative to the vehicle 10, the vehicles 110-150, etc. The vehicles 610 are driving on many different roadways and can be located in locales which are distant from each other such that they experience different weather conditions. As mentioned previously, there can be thousands or millions of the vehicles 610. The vehicles 610 include sensors and a processor configured to compute local road friction conditions on an ongoing basis, as discussed above.

The vehicles 610 report their local road friction conditions, along with their location, to a cloud-based server 630—via cellular communications towers 620 or other wireless communications technology. The server 630 continuously computes road friction estimates based on the data from the multitude of vehicles 610, along with other information available from the internet 640 and other sources. The server 630 computes road friction estimates which are specific to individual roads in individual locales, and communicates the friction estimates out to the vehicles 610. The vehicles 610 can each benefit from road friction for the road ahead based on their particular direction of travel. For example, a particular vehicle may be on a road with a current coefficient of friction of 0.6, but approaching a section of the road which has not been treated for snow and ice removal and therefore is icy and has a much lower coefficient of friction.

The server 630 computes road friction estimates based on three types of data; current friction estimates from the vehicles 610, historical friction estimates from the vehicles 610, and other data such as road surface type from digital maps and current weather conditions by locale. Road friction estimates are therefore computed, for specific roadways in specific locales, as follows:

$$\text{friction} = f_{synthesis}\left(\bigcap_{i=1}^{K}(V_i^{current}), \bigcap_{j=1}^{K}(V_j^{hist}), \bigcap_{n=1}^{L}(V_n^{online})\right) \quad (5)$$

Where $\bigcap_{i=1}^{K}(V_i^{current})$ are the current friction estimates from the vehicles 610 ($V_{i,i=1,K}$), $\bigcap_{j=1}^{K}(V_j^{hist})$ are the historical friction estimates from the vehicles 610, and $\bigcap_{n=1}^{L}(V_n^{online})$ are the friction-relevant data from online sources (such as road type and weather data). These terms are all shown as intersections because the calculations are made based on only the data points that are relevant to a particular roadway and locale. Furthermore, $f_{synthesis}$ is a synthesis function of the three types of data, which could be any appropriate function, such as a weighted average. Finally, the computed value friction may be a relative road friction quality value (for example, ranging from 1 to 10), or may be an estimated coefficient of friction, or both may be computed separately using different synthesis functions.

The road friction estimates are computed by the server 630 for all roadways and locales for which data is available. For example, a particular interstate highway which extends for hundreds of miles may have discrete friction values assigned at every mile, to account for variable weather conditions. The road friction estimates computed by the server 630 are communicated out to the vehicles 610 for their use as will be discussed below.

Figure 8:
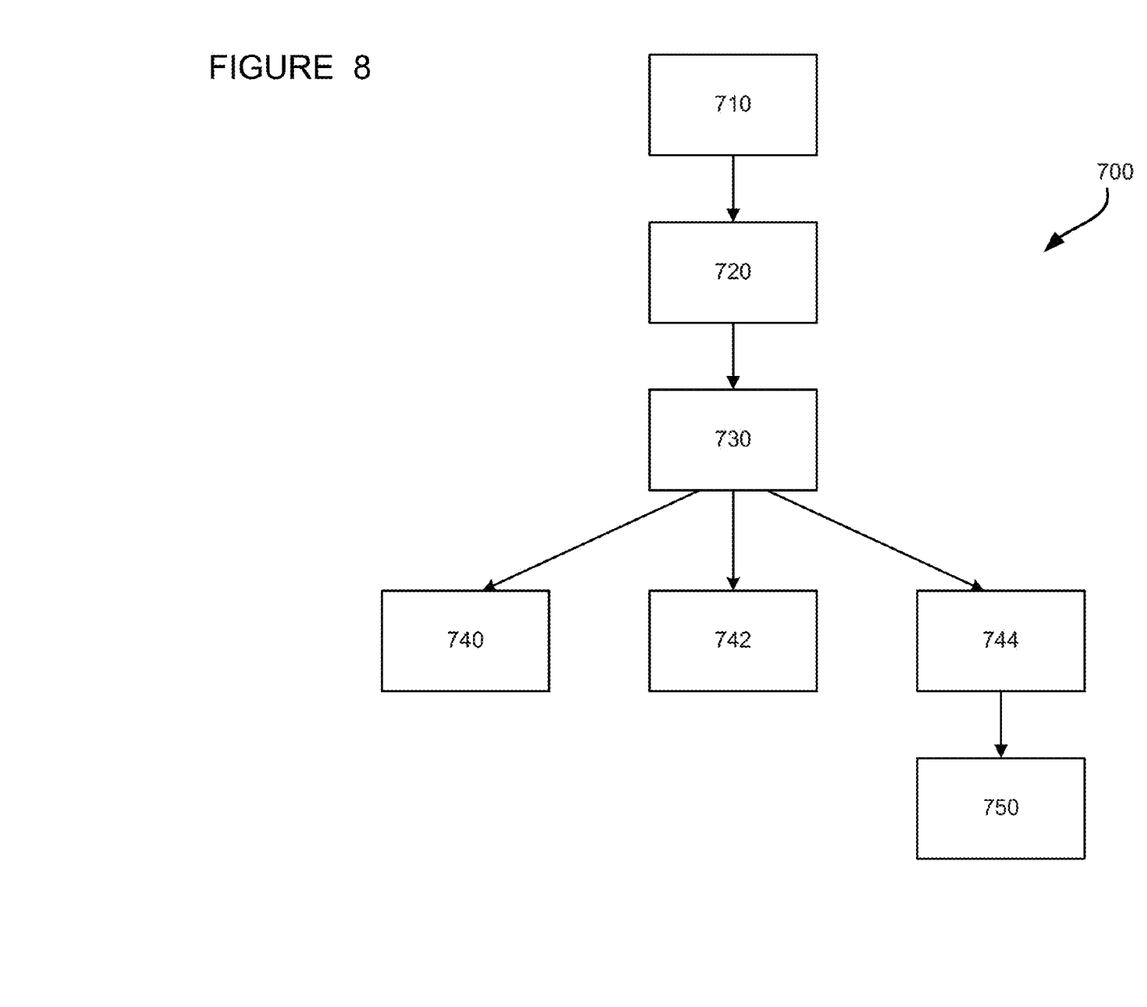
FIG. 8 is a block diagram showing data flow in the central server of FIG. 7 and out to vehicles and other interested parties.

FIG. 8 is a block diagram 700 showing data flow in the central server 630 and out to the vehicles 610 and other interested parties. At box 710, road friction data is collected from many participative sensing vehicles 610. As discussed previously, the real power of the disclosed methods lies in continuous data collection from large numbers of vehicles. In the case of road friction data, different vehicles will be in different driving modes; that is, some will be driving straight, others will be in a curve, some will be accelerating, some will be decelerating, etc. Thus, each vehicle will be experiencing different conditions upon which to base its local estimate of road friction. The server 630 can compute road friction from the many different individual vehicle estimates, which in turn are based on different vehicle dynamic conditions, and therefore gain the accuracy advantage inherent in broad-based sampling. Furthermore, the server 630 will receive multiple friction estimates for each of many different roads and locales, thus providing a basis for the distinct friction estimate calculations.

At box 720, road friction data is filtered and preliminarily analyzed. For example, relative friction data (the values from 1 to 10) may be separated from coefficient of friction estimates from the vehicles 610, and data may be segregated by roadway and locale. At box 730, data fusion is performed on the road friction data. The data fusion at the box 730 may be performed using Equation (5), resulting in friction estimates which are specific to particular roadways and locales.

Three distinct use cases are apparent for the fused road friction data from the box 730. At box 740, vehicle driver notifications may be performed using friction data about the road ahead of a particular vehicle. For example, drivers may be advised of deteriorating friction conditions on an icy patch of road ahead, or advised of an upcoming curve which cannot be safely negotiated based on the friction conditions present. At box 742, friction estimates can be communicated to the vehicles 610 and used as input to vehicle systems such as transmission control and stability control. While this use case still involves communication to vehicles, the resulting actions take place transparent to the driver. At box 744, long-term road friction characterization can be accomplished based on friction data trends over time. For example, it could be observed that a particular stretch of roadway tends to experience icy conditions even when there has been no recent snowfall. This may be a result of a banked road surface where runoff from melting snow re-freezes overnight.

At box 750, appropriate road friction condition information is communicated to governmental transportation departments and road commissions. This information can include current condition information—which may be used for real-time electronic signboard notices, or to dispatch a salt truck to treat a road surface. The information can also include chronic recurring conditions—which may be used to dictate placement of permanent road signs, or to suggest road geometry updates and improvements.

Figure 9:
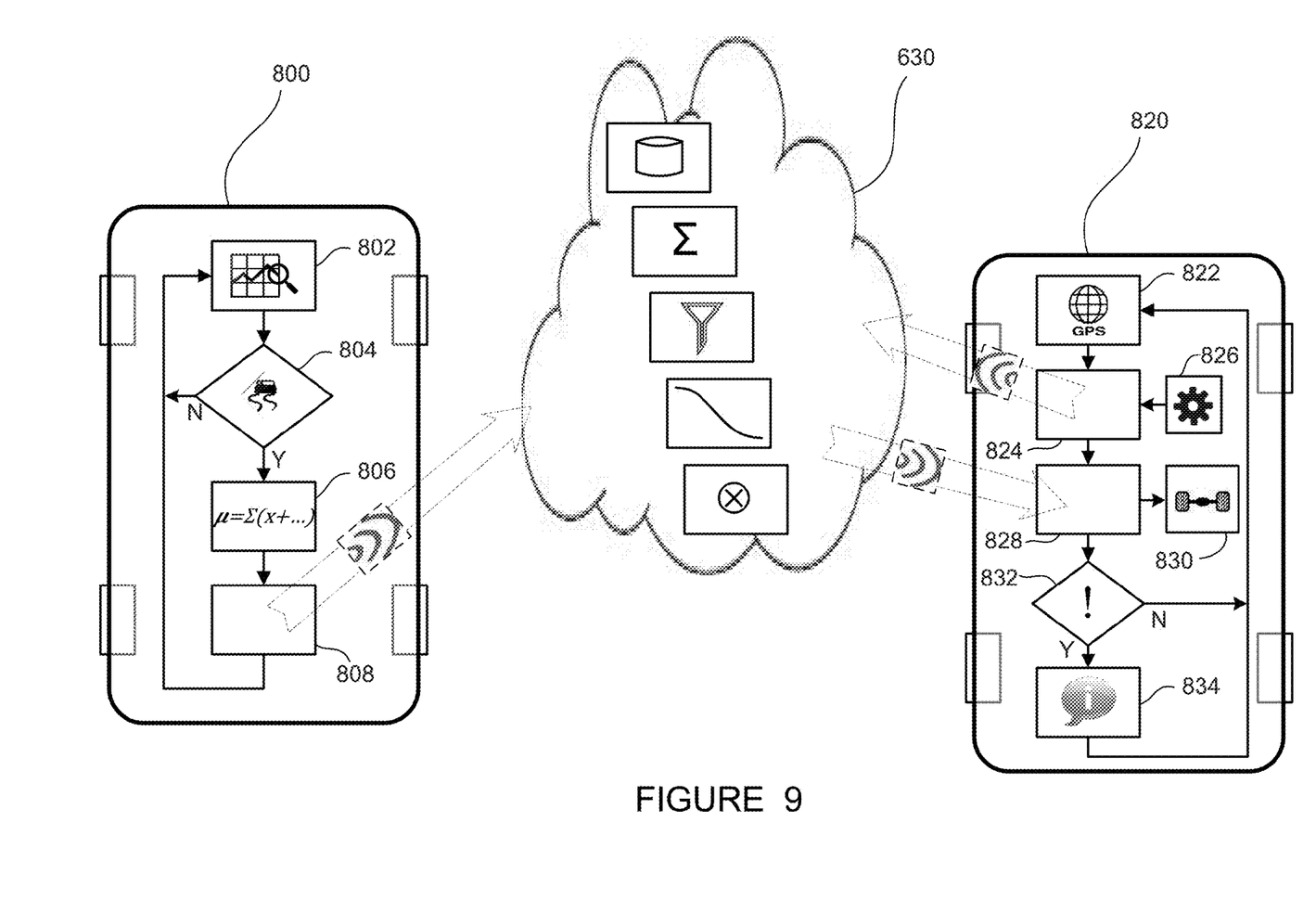
FIG. 9 is a combined block diagram and flowchart diagram showing a friction estimation method used by a participative sensing vehicle, data flow to and processing in a cloud-based system, and a method used by a vehicle requesting road friction advisories.

FIG. 9 is a combined block diagram and flowchart diagram showing a friction estimation method used by a participative sensing vehicle, data flow to and processing in a cloud-based system, and a method used by a vehicle requesting road friction advisories. A data collection vehicle 800 could be any of the vehicles 610 discussed previously. That is, the collection vehicle 800 has participative sensing systems for collecting data about road friction conditions it is experiencing, and sending that data for centralized collection, aggregation and dissemination. The vehicle 800 runs a process which begins at box 802 where vehicle data is monitored. The data being monitored at the box 802 includes all of the data about the vehicle 800 which can be used for friction estimation, as discussed relative to FIG. 5 previously.

At decision diamond 804, it is determined whether an event trigger has occurred. The event trigger could simply be the passage of a certain distance or time since a previous friction estimation, or may be a change of road surface type, a turn onto a different roadway, a noticeable change in weather, a specific low-friction event like ABS or TCS activation, etc. If no event trigger is detected, the process returns to the box 802 for continued monitoring of data. If an event trigger is detected, then at box 806 a road friction estimate is computed. The friction estimate is calculated using the techniques described above, including the flowchart diagram 500 of FIG. 6. At box 808, the road friction estimate is submitted to the cloud server 630 for aggregation. Along with the friction estimate, other information may be submitted to the cloud server 630—including, at a minimum, the location of the collection vehicle 800 and the road on which it is travelling.

An advisory-receiving vehicle 820 is any of the vehicles 610 equipped with a communications system (such as a telematics system or a V2V/V2I system) capable of receiving advisories from the cloud server 630. If the vehicle 820 has advisory receiving turned on, then it runs a process as shown in FIG. 9. At box 822, the vehicle 820 acquires its geographic location using GPS. If the vehicle 820 is not GPS-equipped, it may still be able to acquire its location by other techniques, such as V2V communications with another vehicle which does have GPS and a known position relative to the other vehicle. At box 824, the vehicle 820 requests road friction tags from the cloud server 630 based on its geographic location. As discussed previously, the server 630 may have road friction condition information from millions of vehicles and covering large geographic areas, so it is necessary for the vehicle 820 to identify its location in order to obtain only relevant friction tags (those which apply to the road on which the vehicle 820 is traveling, and in the same geographic locale).

At box 826, customization menu settings are applied for the vehicle 820. These settings include things like; receive road friction advisories on or off; whether to use audio or visual systems to notify the driver of advisories received; etc.

At box 828, the vehicle 820 processes response tags (road friction data which is relevant to the vehicle 820) received from the cloud server 630. At box 830, the road friction data received from the server 630 is provided to vehicle systems such as all-wheel drive controls, stability control systems, ABS and TCS. These vehicle systems may be able to optimize performance based on expected road surface friction conditions on the road ahead.

At decision diamond 832, the vehicle 820 determines whether to issue an alert to the driver based on the response tags (friction advisories) received. The decision to issue an alert or not is based on the settings as established at the box 826. For example, a driver may have set a preference to be notified only of urgent warning-level advisories, in which case the vehicle 820 would not issue an alert for an informational advisory related to a wet road surface ahead, for example.

If no alert is to be issued, then from the decision diamond 832 the process returns to the box 822 to reacquire geographic location and again request advisories. If an alert is to be issued, then at box 834 the alert is delivered to the driver in whatever form is selected (audio/visual/haptic) by the driver, based on the content of the response tags received at the box 828. The process then returns to the box 822.

The functions of the cloud server 630 are basically to receive friction-related data reports from many vehicles, store and process the data, and disseminate friction-related advisories to many vehicles as they are relevant to each individual vehicle based on its locale and the road on which it is travelling. As discussed previously, the cloud server 630 could be a server or cluster of servers at a single physical location, or the server 630 could be a true cloud-based architecture including multiple servers at multiple locations with replicated and shared data.

The data in the cloud server 630 follows a lifecycle which includes storage, aggregation, filtering, decay and eventual purging. These lifecycle steps—particularly the aggregation, filtering and decay—were discussed previously.

Using the methods disclosed above, road surface friction conditions can be detected using data from many participative sensing system vehicles. By aggregating and filtering data from a large number of participating vehicles, road friction conditions can be accurately estimated for many different roads in many different locales. Vehicle drivers can benefit from the information contained in the accurate, timely and relevant friction-related advisories—thereby avoiding dangerous situations which may have occurred in absence of the advisories. In addition, vehicle systems such as ABS and TCS can be tailored for optimal performance based on the expected road surface friction conditions on the road ahead.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for identifying hazardous driving conditions using vehicular participative sensing systems, said method comprising:
   providing data about traffic safety events by a plurality of participative sensing system vehicles;
   collecting, on a server computer including a processor and memory, the data about the traffic safety events from the participative sensing system vehicles;
   analyzing the data about the traffic safety events, by the server computer, to identify hazardous conditions, including aggregating the data, filtering the data, applying a time-decay to the data and purging the data;
   issuing advisories about the hazardous conditions from the server computer to advisory-receiving vehicles and other entities, where the advisories include a type of the hazardous condition and a location of the hazardous condition; and
   notifying drivers of the advisory-receiving vehicles of the hazardous conditions described in the advisories.

2. The method of claim 1 wherein providing data about traffic safety events includes monitoring data from vehicle sensors and systems, identifying a trigger event, computing a safety metric about the traffic safety event, and communicating the safety metric and a vehicle location to the server computer.

3. The method of claim 2 wherein monitoring data from vehicle sensors and systems includes monitoring data from vehicle dynamics sensors and object detection sensors, data from vehicle systems available on a vehicle data bus, and data about other vehicles from a vehicle-to-vehicle (V2V) communication system.

4. The method of claim 1 wherein the traffic safety events include another vehicle being driven dangerously, a disabled vehicle, a traffic accident, an obstacle on a road, a pothole or other structural problem with the road, low visibility, snow or ice on the road, and abnormal vehicle braking.

5. The method of claim 1 wherein analyzing the data about the traffic safety events to identify hazardous conditions includes segregating the hazardous conditions into those that relate to behavior of specific other vehicles and their drivers, those that relate to chronic conditions that repeatedly occur at a particular fixed location on a roadway, and those that relate to transient conditions at various locations on the roadway.

6. The method of claim 1 wherein analyzing the data about the traffic safety events to identify hazardous conditions includes assigning more weight to hazardous conditions which are identified in data received from multiple vehicles over an extended period of time.

7. The method of claim 1 wherein issuing advisories about the hazardous conditions from the central server to advisory-receiving vehicles includes designating the advisories as watch-level advisories related to moderately hazardous conditions or warning-level advisories related to severely hazardous conditions.

8. The method of claim 1 wherein issuing advisories about the hazardous conditions from the central server to other entities includes issuing advisories to a road commission which has responsibility for a road on which the hazardous condition exists.

9. The method of claim 8 wherein the advisories to the road commission include advisories of conditions needing immediate attention including road repair, snow plowing and road salt, and electronic sign message content, and advisories of chronic conditions needing long-term attention including road design changes and permanent road sign changes.

10. A method for identifying hazardous driving conditions using vehicular participative sensing systems, said method comprising:
providing data about traffic safety events by a plurality of participative sensing system vehicles, including monitoring data from vehicle sensors and systems, identifying a trigger event, computing a safety metric about the traffic safety event, and wirelessly communicating the safety metric and a vehicle location to a server computer;
collecting, on the server computer including a processor and memory, the data about the traffic safety events from the participative sensing system vehicles;
analyzing the data about the traffic safety events, by the server computer, to identify hazardous conditions, including segregating the hazardous conditions into those that relate to behavior of specific other vehicles and their drivers, those that relate to chronic conditions that repeatedly occur at a particular fixed location on a roadway, and those that relate to transient conditions at various locations on the roadway;
issuing advisories about the hazardous conditions from the server computer to advisory-receiving vehicles, where the advisories include a type of the hazardous condition and a location of the hazardous condition;
notifying drivers of the advisory-receiving vehicles of the hazardous conditions described in the advisories; and
issuing advisories about the hazardous conditions from the server computer to a road commission which has responsibility for a road on which the hazardous condition exists, where the advisories include advisories of conditions needing immediate attention including road repair, snow plowing and road salt, and electronic sign message content, and advisories of chronic conditions needing long-term attention including road design changes and permanent road sign changes.

11. The method of claim 10 wherein the traffic safety events include another vehicle being driven dangerously, a disabled vehicle, a traffic accident, an obstacle on a road, a pothole or other structural problem with the road, low visibility, snow or ice on the road, and abnormal vehicle braking.

12. The method of claim 10 wherein analyzing the data about the traffic safety events to identify hazardous conditions includes assigning more weight to hazardous conditions which are identified in data received from multiple vehicles over an extended period of time.

13. A vehicular participative sensing system for identifying hazardous driving conditions, said system comprising:
a plurality of participative sensing system vehicles with sensors and a processor configured to provide data about traffic safety events, where the processor monitors data from vehicle dynamics sensors and object detection sensors, data from vehicle systems available on a vehicle data bus, and data about other vehicles from a vehicle-to-vehicle (V2V) communication system, said participative sensing system vehicles also including a wireless communications system for communicating the data about the traffic safety events;
a server computer including a processor and memory, said server computer being configured to receive the data about the traffic safety events from the participative sensing system vehicles, analyze the data about the traffic safety events to identify hazardous conditions, and issue advisories about the hazardous conditions, where the advisories include a type of the hazardous condition and a location of the hazardous condition, and where analyzing the data includes aggregating the data, filtering the data, applying a time-decay to the data and purging the data; and
a plurality of advisory-receiving vehicles with a wireless communications system for receiving the advisories about the hazardous conditions, and a processor configured to notify drivers of the hazardous conditions described in the advisories.

14. The system of claim 13 wherein the processor in the participative sensing system vehicles is configured to monitor the data from the vehicle dynamics sensors and the object detection sensors, the data on the vehicle data bus, and the data from the V2V communication system, identify a trigger event, compute a safety metric about the traffic safety event, and communicate the safety metric and a vehicle location to the server computer.

15. The system of claim 13 wherein the traffic safety events include another vehicle being driven dangerously, a disabled vehicle, a traffic accident, an obstacle on a road, a pothole or other structural problem with the road, low visibility, snow or ice on the road, and abnormal vehicle braking.

16. The system of claim 13 wherein the server computer is configured to segregate the hazardous conditions into those that relate to behavior of specific other vehicles and their drivers, those that relate to chronic conditions that repeatedly occur at a particular fixed location on a roadway, and those that relate to transient conditions at various locations on the roadway.

17. The system of claim 13 wherein the server computer is configured to assign more weight to hazardous conditions which are identified in data received from multiple vehicles over an extended period of time.

18. The system of claim 13 wherein the server computer is configured to issue advisories about the hazardous conditions to the advisory-receiving vehicles which are designated as watch-level advisories related to moderately hazardous conditions or warning-level advisories related to severely hazardous conditions.

19. The system of claim 13 wherein the server computer is configured to issue advisories about the hazardous conditions to a road commission which has responsibility for a road on which the hazardous condition exists, and where the advisories to the road commission include advisories of conditions needing immediate attention including road repair, snow plowing and road salt, and electronic sign message content, and advisories of chronic conditions needing long-term attention including road design changes and permanent road sign changes.

20. A vehicular participative sensing system for identifying hazardous driving conditions, said system comprising:
- a plurality of participative sensing system vehicles with sensors and a processor configured to provide data about traffic safety events, where the processor monitors data from vehicle dynamics sensors and object detection sensors, data from vehicle systems available on a vehicle data bus, and data about other vehicles from a vehicle-to-vehicle (V2V) communication system, said participative sensing system vehicles also including a wireless communications system for communicating the data about the traffic safety events;
- a server computer including a processor and memory, said server computer being configured to receive the data about the traffic safety events from the participative sensing system vehicles, analyze the data about the traffic safety events to identify hazardous conditions, and issue advisories about the hazardous conditions, where the advisories include a type of the hazardous condition and a location of the hazardous condition, where analyzing the data includes segregating the hazardous conditions into those that relate to behavior of specific other vehicles and their drivers, those that relate to chronic conditions that repeatedly occur at a particular fixed location on a roadway, and those that relate to transient conditions at various locations on the roadway; and
- a plurality of advisory-receiving vehicles with a wireless communications system for receiving the advisories about the hazardous conditions, and a processor configured to notify drivers of the hazardous conditions described in the advisories.

21. A vehicular participative sensing system for identifying hazardous driving conditions, said system comprising:
- a plurality of participative sensing system vehicles with sensors and a processor configured to provide data about traffic safety events, where the processor monitors data from vehicle dynamics sensors and object detection sensors, data from vehicle systems available on a vehicle data bus, and data about other vehicles from a vehicle-to-vehicle (V2V) communication system, said participative sensing system vehicles also including a wireless communications system for communicating the data about the traffic safety events;
- a server computer including a processor and memory, said server computer being configured to receive the data about the traffic safety events from the participative sensing system vehicles, analyze the data about the traffic safety events to identify hazardous conditions, and issue advisories about the hazardous conditions, where the advisories include a type of the hazardous condition and a location of the hazardous condition, where the advisories are designated as watch-level advisories related to moderately hazardous conditions or warning-level advisories related to severely hazardous conditions; and
- a plurality of advisory-receiving vehicles with a wireless communications system for receiving the advisories about the hazardous conditions, and a processor configured to notify drivers of the hazardous conditions described in the advisories.

* * * * *